Oct. 29, 1968

R. G. GABRIELSON  3,408,626
CONTROL SYSTEM WITH VARIABLE LENGTH MESSAGES
AND PLURAL DECODER LEVELS

Filed July 16, 1964

INVENTOR.
Reidar G. Gabrielson

BY
Mueller & Aichele

ATTY'S.

INVENTOR.
Reidar G. Gabrielson

Oct. 29, 1968  R. G. GABRIELSON  3,408,626
CONTROL SYSTEM WITH VARIABLE LENGTH MESSAGES
AND PLURAL DECODER LEVELS
Filed July 16, 1964

INVENTOR.
Reidar G. Gabrielson
BY
Mueller & Aichele
ATTY'S.

INVENTOR.
Reidar G. Gabrielson

BY
Mueller & Aichele
ATTY'S.

United States Patent Office 3,408,626
Patented Oct. 29, 1968

3,408,626
CONTROL SYSTEM WITH VARIABLE LENGTH
MESSAGES AND PLURAL DECODER LEVELS
Reidar G. Gabrielson, Scottsdale, Ariz., assignor to Motorola, Inc., Franklin Park, Ill., a corporation of Illinois
Filed July 16, 1964, Ser. No. 383,202
5 Claims. (Cl. 340—163)

ABSTRACT OF THE DISCLOSURE

Supervisory control system having a central station and a plurality of remote stations joined by a common communication line. A message type signal indicates message length to a receiving station. Such station has a decoding level for each message length made selectively responsive thereto by a first or message length decoder. Provisions are made for checking length in each decoding level and decoder.

This invention relates to digital supervisory control systems, and particularly to a system which is capable of handling digital messages of different lengths and so affords an unusual degree of system flexibility.

One of the dominant considerations in the designing of digital transmission systems is the message structure. The message, consisting of a series of bits, is made long enough that a distinctive combination of bits will be available for every function which must be identified by code. It might seem that no matter how many functions are to be performed by the system, it would be a simple matter to make the messages long enough to accommodate every bit which might have to be transmitted in a worst case situation. However, as the message length increases, the time required for transmission also increases and it is inefficient to use long messages in those cases where there is little information content in the message. The bits can be made shorter to allow transmission of more bits in a given time interval. But as the bit length decreases the bandwidth required for transmission increases, so the available bandwidth is a practical limitation on message length.

Aside from bandwidth and system speed considerations, the use of a fixed message length limits the ability of the designer to add or omit functions in a given system, particularly after it has been installed. Ordinarily the user wants a system capable of handling whatever functions are needed at the time of installation, but also capable of being expanded if additional functions are needed later. If the message structure is originally made long enough to accommodate all possible future needs, it is obvious that while the system is operating at less than full capacity the message length is not optimum. On the other hand, it is usually necessary to modify a system considerably if the message structure must be lengthened after installation in order to accommodate more functions.

It would clearly be desirable to have a system in which the length of each individual message is tailored to the partciular function to be performed in response to that message, and one which would allow circuit functions to be added or deleted without affecting the message structures for other portions of the equipment. It is, accordingly, a primary object of this invention to provide a digital supervisory control system which uses such variable-length messages.

Another object of the invention is to provide encoding and decoding equipment for a variable message length system which route messages to different portions of the system depending on the coding of the messages.

A feature of the invention is the encoding and decoding of messages by types and the use of part of the message structure to identify different types of messages. The decoding equipment includes a first level which recognizes the message type information and routes the message to another decoding level which decodes the functional information in messages of that type. Thus, there may be as many supplementary decoding levels as there are message types, and different types of messages can be of different lengths.

Another feature of the invention is a message structure in which the end of a message frame is defined by a hole or gap in the message, and the end of the message is defined by more than one hole. The equipment decodes responsive to a single hole and conditions itself to receive the next message responsive to two or more holes in series. The use of holes to define message frames and the over-all message length can be advantageously combined with level decoding to provide efficient transmission and handling of messages.

Figure 1:
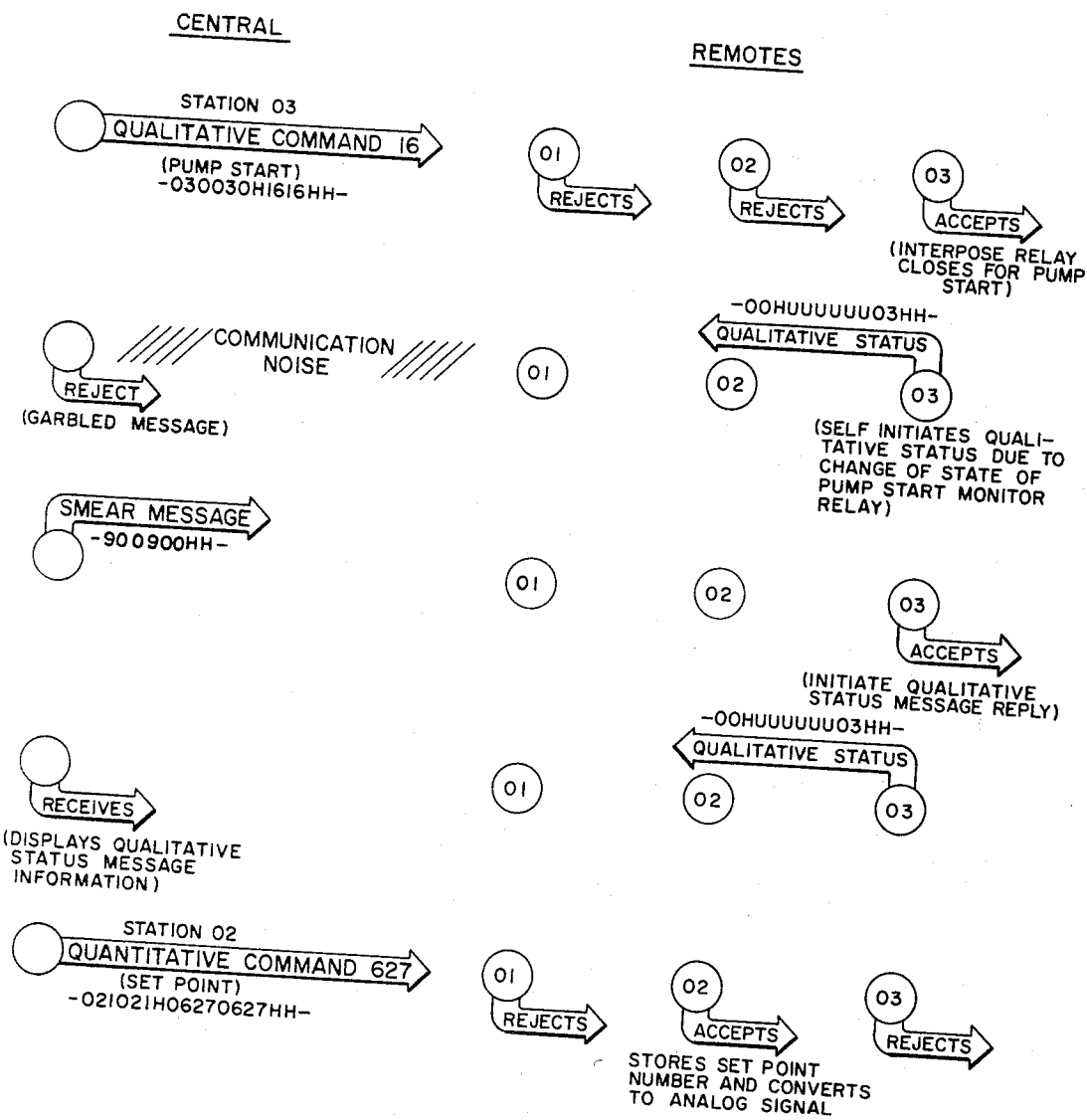
FIG. 1 is a word picture showing schematically how one embodiment of the invention handles different types of messages.

Referring first to FIG. 1, there is shown a sequence of messages which illustrates the operation of a system embodiment of the invention. In each line of FIG. 1 a central station is shown at the left and three remote stations are shown at the right. Starting with line A, the central station transmits a qualitative command to remote station 03. This command is coded as sixteen, and the station address is 03. Such messages are assigned a message type label, and in the case of a qualitative command the label is zero in this embodiment.

Figure 2:
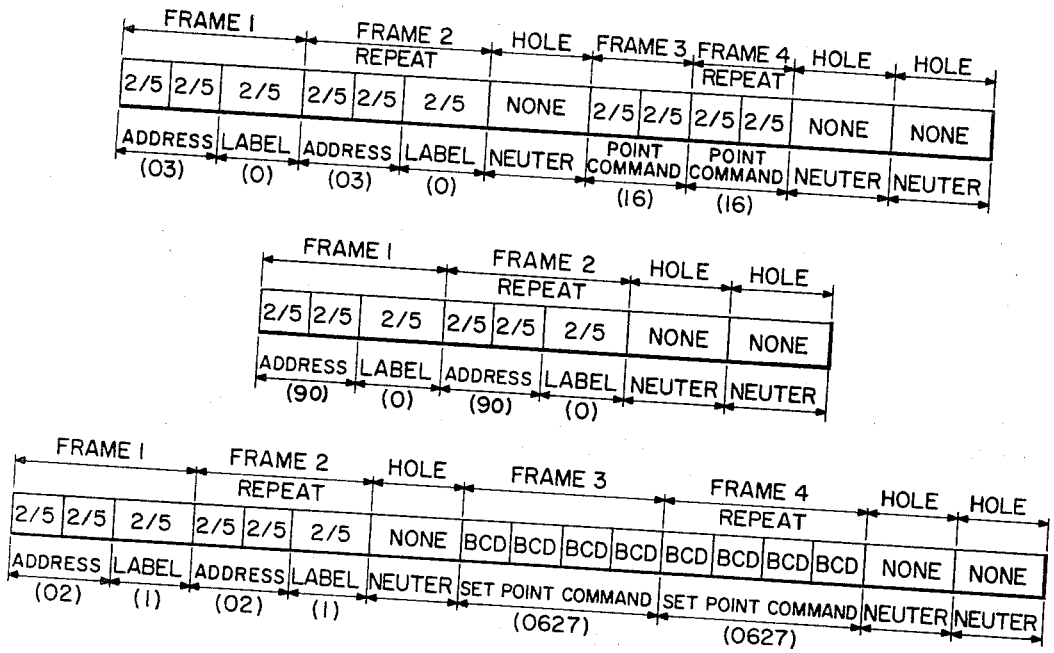
FIG. 2 illustrates pictorially the structure of three different types of messages included in the system operation depicted in FIG. 1.

The manner in which the address, label and command are transmitted is illustrated by the message structure at the top of FIG. 2. This message consists of four message frames with a hole in the middle and two holes at the end. A hole is an uncoded gap in the message, and by using the return-to-neuter transmission method, a hole can be transmitted as the center or neuter frequency. In this embodiment, a hole is five bits of the neuter frequency. Each information digit of the message is also five bits long, and a word consists of one or more digits.

As shown in FIG. 2, the address word 03 and the label 0 make up the first message frame. The second frame is simply a repeat of the first one for security purposes as will be explained later. These frames are encoded with a two out of five (2/5) binary code as indicated, and are followed by a hole (H). The fourth frame is a repeat of the third frame which is the command word sixteen. The 2/5 code is also used for encoding these frames. The complete qualitative command message to the third remote station is then 030030H1616HH.

The message is accepted by the third remote station and is rejected by the other two stations since it is not addressed to them. The third station performs the action called for by the message, which in this case is the closing of a relay to start a pump. Remote station 03 then sends a message back to the central station to report the status of the pump and other functions monitored at the remote station. As shown in FIG. 1, the qualitative status message from station 03 is 00HUUUUUU03HH. The first two digits are the label which identifies the message type. For qualitative messages the label may be zero, and there are two zeroes since the label is repeated. There are no digits identifying the addressee in remote-to-central messages. After the decode hole (H) there is a series of unitary digits (U) followed by the sender's address 03. Information represented by the unitary digits are used to bring status displays at the central station up to date.

To further illustrate the types of messages handled by the system, it will be assumed that the qualitative status message from station 03 becomes so garbled by noise on the communication channel that it is rejected by the central station. The latter station then sends a "smear" message to all remote stations of the system to cause any station which has transmitted within a fixed time immediately preceding the smear command to repeat the message.

Since the smear message goes to all stations, the digits for the smear function (90 in this system) are at the beginning of the first frame in place of the address word. The zero following the smear digits 90 merely fills out the message structure—it signifies only that the message will be decoded by a first level decoder as will be explained further. In the second frame the digits 900 are repeated for message security purposes, and this second message frame is followed by two holes signifying the end of the message.

Although all three remote stations receive the smear message, only station 03 responds to it since it is the only station which transmitted a message during the preceding reference time interval. The third station responds to the smear message by repeating the qualitative status message as shown in FIG. 1. This message is received at the central station and causes the central station to update the qualitative status display for the third remote station.

In the last line of FIG. 1, the central station is shown sending a quantitative command to the second remote station 02. The particular command shown in FIG. 1 is a quantitative command 0627 for adjusting the set point of a controller associated with the remote station 02. The code for this command is 021021H06270627HH, and its message structure is shown in FIG. 2 at the bottom. The first frame is the station address 02 and the message type 1. The second frame is simply a repeat of the first frame and is followed by a hole. The third frame contains the set point information 0627, and again the fourth frame is a repeat of the third frame. In this embodiment, the set point information is encoded in binary coded decimal form (BCD). The end of the message is denoted by two holes as before. The second remote station 02 accepts the quantitative command and the other two remote stations reject it as shown in FIG. 1. The second remote station performs the set point adjustment function as called for by the quantitative command.

From the foregoing description of FIGS. 1 and 2, it will be apparent that the system is designed to handle messages of different types and different lengths. The variable message length capability makes it possible to tailor individual messages to the information contained in them and the functions to be performed by them as previously mentioned. The messages may be encoded using different codes as indicated by FIG. 2. Reference is made to application Ser. No. 299,727 filed Aug. 5, 1963, by the present inventor for further examples of the use of unitary code, binary coded decimal and the 2/5 code referred to above.

Figure 3:
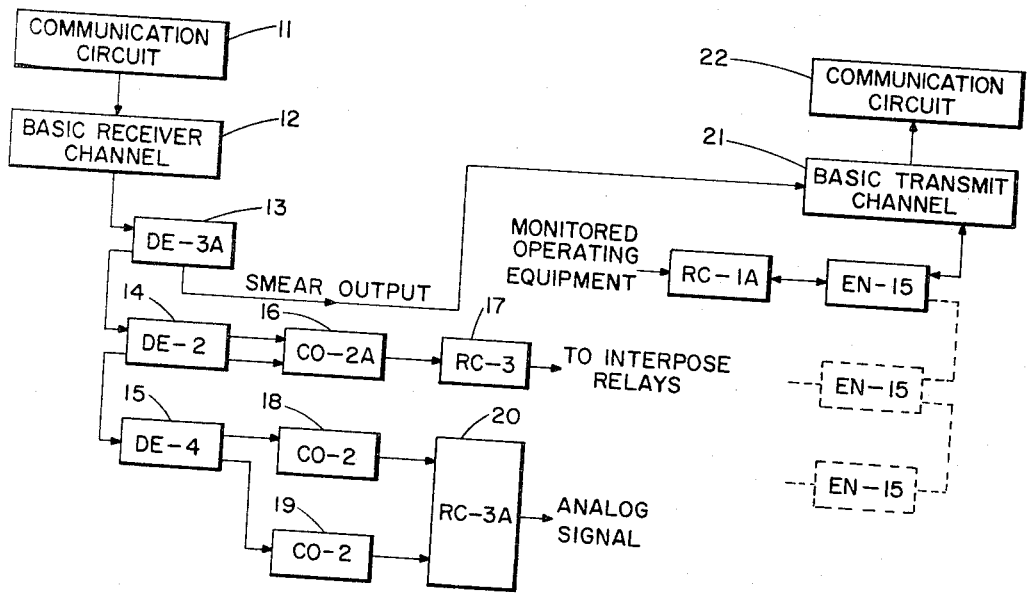
FIG. 3 is a block diagram for a remote station of a supervisory control system which constitutes one embodiment of the invention.

FIG. 3 is a block diagram of a typical remote station which is designed to handle messages of various lengths. The circuits illustrated in FIG. 3 may be used for any of the remote stations of a supervisory control system in accordance with the invention. The remote station has a communication circuit 11 which receives incoming messages and supplies electrical signals representing the message bits to the basic receiver channel 12. One of the functions of the receiver channel is to convert the electrical signals to current pulses and shape them to be compatible with the decoding circuitry. The current pulses are then supplied to the decoding levels 13, 14 and 15. Since these decoder levels are designed to decode messages of a given number of digits, the designation used is DE followed by a number identifying the number of digits. The first level handles three digits and therefore is designated DE–3, the second level handles two digits and so is designated DE–2, and the third level for handling four digits is designated DE–4.

The decoder levels are pre-conditioned such that the first level 13 is gated open prior to the beginning of the message and therefore accepts the message pulses, whereas the second and third levels 14 and 15 are gated closed and do not initially accept the message pulses. Assuming that a qualitative command message has been received by the remote station shown in FIG. 3, the message will be processed by the decoder levels as follows. The first two words (030030) will be accepted and stored by the first decoder level 13. The first decoder level includes message security circuitry which checks the first two message frames to determine if the message is correct. Such message security circuits will be described more fully later, but in general if the message contains the correct number of bits and if each two corresponding bits of the two message frames are identical, the first decoder level 13 will be enabled to decode the message. On the other hand, if the message contains other than the correct number of bits, or if any two corresponding bits are not the same, the first decoder level will reject the message.

Decoding is initiated by a "decode" command generated by circuitry within the basic receiver channel 12 responsive to the hole at the end of the second message frame. Assuming that the first two message frames are correct, the "decode" command causes the first level decoder 13 to decode the first two message frames and gate the second level decoder 14 open. At the same time, the first decoder level 13 is gated closed.

The second decoder level 14 then accepts the third and fourth message frames in the qualitative command message. These frames are checked for correctness by message security circuitry in the same general manner as just described in connection with the first decoder level. If the third and fourth message frames are correct, they will be decoded by the decoder level 14 in response to a command signal generated by the basic receiver channel 12 during the time of the first hole at the end of the message. The second decoder level 14, upon decoding the message, supplies outputs to a further decoding stage 16 associated with the second level decoder. The latter decoder stage, identified CO–2A, supplies stretched output signals which are routed to interpose relays to initiate the function called for by the qualitative command. In the case being described, the qualitative command 16 causes the remote station to actuate interpose relays which start a pump, but there are many different types of qualtative functions which can be performed by the remote station.

The manner in which the remote station of FIG. 3 decodes a smear message will now be described to point out the differences in operation as compared to decoding of the qualitative status command. As has been described, the smear message has only two frames, and it is decoded completely by the first level decoder 13. As before, the first level decoder checks the message to determine if it is correct, and if it is correct, decodes the message responsive to the first hole at the end of the message. The first decoder level recognizes this message as a smear command and supplies a smear output to the basic transmit channel 21 which causes the preceding message to be repeated. The two holes at the end of the smear message merely ensure that the first level decoder 13 is reconditioned to accept the next message.

In the case of a quantitative command message, the operation is similar except that the third and fourth frames of the message are routed to a third decoder level 15 rather than to the second level 14. This selection of decoder levels is accomplished by means of the message label which appears at the end of the first and second message frames. For qualitative a message, the label is zero and the first decoder level 13 responds to this information by gating the second decoder level 14 open. However, where the message label is one as is the case with the quantitative command, the first decoder level gates open the third level 15 rather than the second level.

The third decoder level 15 then accepts the third and fourth message frames, each of which contains four digits, and decodes those message frames during the first hole at the end of the message. Upon receiving the second hole at the end of the message, the basic receiver channel provides a command signal which reconditions all decoder levels so that only the first level is open and able to receive the next message. The third level decoding is completed by two supplementary decoding stages 18 and 19 associated with the decoder 15. The latter stages activate a module 20 identified RC-3A which converts the pulse outputs from modules 18 and 19 to an analog signal which provides a desired continuous adjustment at the remote station. The quantitative command which has been described is for adjusting a set point, so the analog signal supplied by module 20 accomplishes that set point adjustment.

The remote station may also receive qualitative messages which merely ask the remote station to send status information back to the central station. Such messages would be decoded by the first and second decoder levels 13 and 14, and outputs would be supplied to the modules identified EN-15 in FIG. 3. The latter modules encode the status of the operating equipment, and the coded status messages are transmitted to the central station by the transmit channel 21 via the communication circuit 22. Similarly, messages which call for quantitative information would be decoded by the first and second decoding levels 13 and 14 which would in turn initiate transmission of quantitative status messages back to the central station. The circuits for handling qualitative and quantitative status messages have been simplified in FIG. 3 in order to simplify the description.

Figure 4:
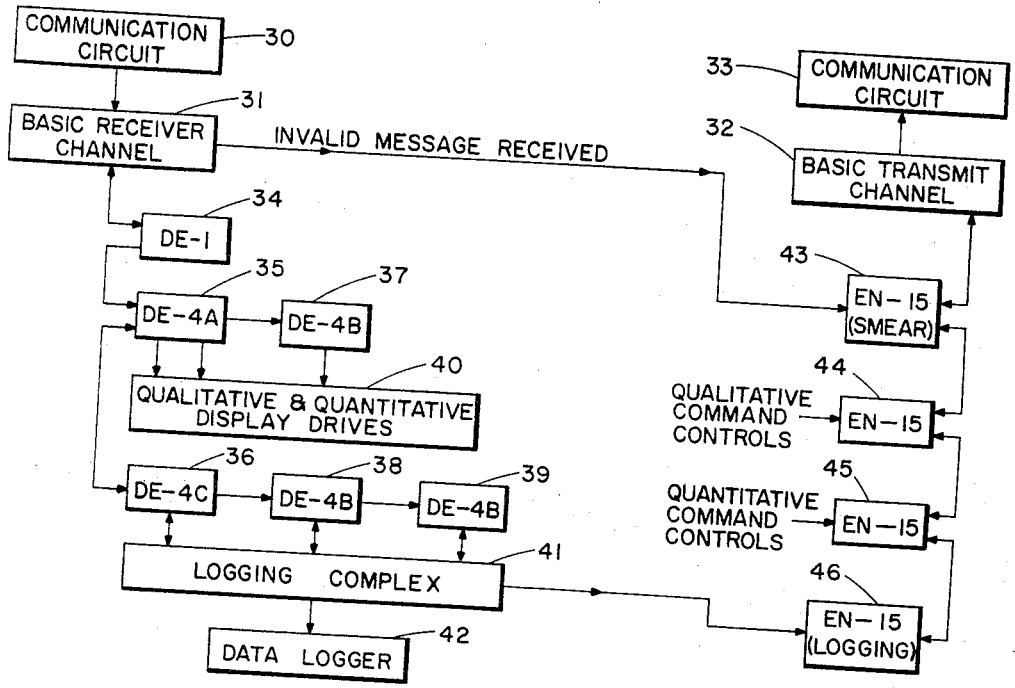
FIG. 4 is a block diagram for a central station of the same system embodiment.

FIG. 4 is a block diagram of a central station provided with decoding levels in accordance with the invention. The central station has a communication circuit 30, a basic receiver channel 31, a basic transmit channel 32 and another communication circuit 33 similar to those at the remote station. The first level decoder 34 is designed to decode one digit of a message and therefore is designated DE-1. At the central station, two second level decoders 35, 37 and 36, 38, 39 are provided. The second level decoders 35 and 37 each decode four digits and supply outputs to driving devices for qualitative and quantitative displays. These are the displays which indicate the status of qualitative and quantitative functions at the remote stations. The second level decoders 36, 38 and 39 also are designed to decode four digits each and supply outputs to logging modules 41 and 42 which process data received from the remote stations. The encoding modules 43, 44, 45 and 46 respectively encode smear, qualitative, quantitative and logging commands.

In the previous description of FIG. 1, a sequence of messages was described in which the central station received a garbled message from one of the remote stations. Each decoder level contains message security circuitry capable of detecting garbling. The decoder which detects garbling causes the basic receiver channel to supply a signal to the smear encoder 43 responsive to the invalid message. The latter signal causes encoder 43 to encode a smear command in accordance with the previous description. The smear command is then transmitted by the basic transmit channel 32 to the remote stations via the communication circuit 33.

The remote station then repeats its last message which in the case described was a qualitative status message. When this message is correctly received at the central station, it is decoded by the appropriate decoding levels. The first digit of the qualitative status message was a zero and the second digit another zero. These digits are checked by the message security circuitry of the first level decoder DE-1 and if all ten bits of the first two digits are correct, decoding takes place during the hole following the first two digits. The digit zero is the label of the message and is recognized by the first level decoder such that it gates open the appropriate second level decoder. The qualitative status message would be routed to the decoders 35 and 37 for updating displays. This routing is determined by the label of the message. The information content of the particular status message described in connection with FIG. 1 was UUUUUU03. The six U digits are unitary bits, and each indicates the status of a particular qualitative function at the remote station. Thus, the status of all such functions at the remote station is updated by the qualitative status message. One of these bits is used for the pump status which was changed by the preceding message from the central station. Since there are a total of eight digits in the third and fourth frames of the message, two DE-4 decoders are used for second level decoding of the status message. The message security of the latter decoders checks the bits to determine whether the correct number is present. If the correct number of bits are present, the third and fourth frames are decoded by modules 35 and 37 during the first hole following the fourth frame. Outputs are supplied from decoders 35 and 37 to the drivers 40 which in turn update the status displays in accordance with the information content of the message.

A quantitative status message would be handled similarly at the central station. Its information content is decoded by modules 35 and 37 and the appropriate displays are updated. Other messages may contain quantitative data to be logged at the central station, and such data is decoded by modules 36, 38 and 39 and stored in the data logger 42.

Figure 5:
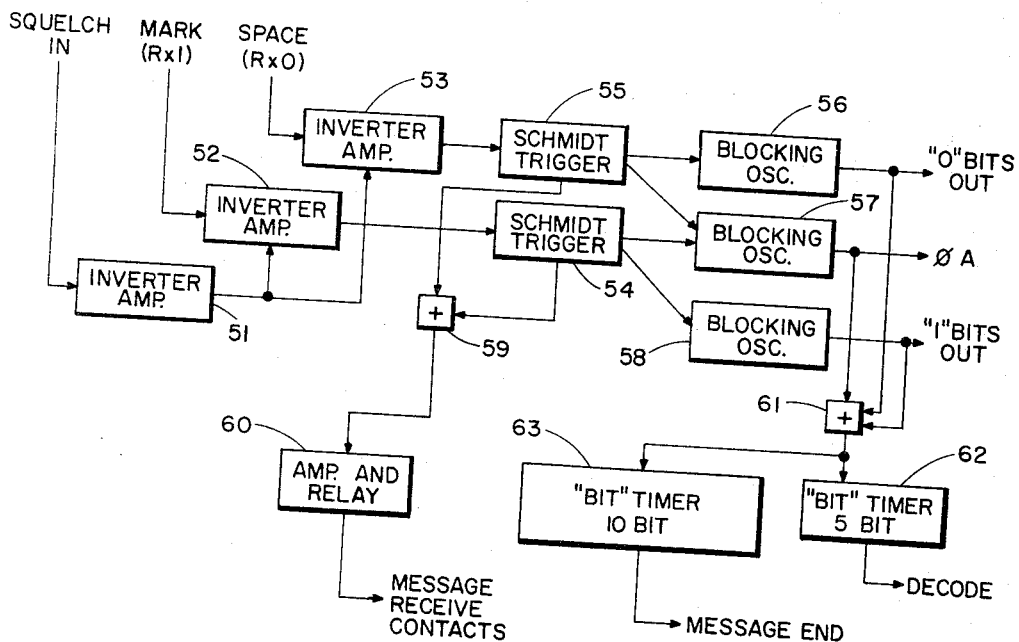
FIG. 5 is a block diagram of the basic receiver channel included in both FIG. 3 and FIG. 4.

FIG. 5 is a functional block diagram of the basic receiver channel which is used at both the central station and the remote stations. The channel has three inputs identified as "squelch," "mark," and "space." The squelch input is processed by an inverter amplifier 51 which responds to open the other two inverter amplifiers 52 and 53 so that they will accept input pulses. Pulses representing binary one bits are supplied to the inverter amplifier 52, and the pulses representing binary zero bits are supplied to the inverter amplifier 53. At the input to the receiver channel, the one and zero pulses are called mark and space pulses respectively simply to distinguish them from the output zero and one pulses. The amplified input pulses are fed to Schmidt trigger circuits 54 and 55. A pulse at the input of either of the trigger circuits will cause it to change states and supply an output pulse. The trigger circuits perform a shaping function so that the pulses supplied to the blocking oscillators 56, 57 and 58 will have steep leading and trailing edges.

Outputs are supplied from the trigger circuits 54 and 55 to an "or" gate 59. So long as pulses are being supplied to the "or" gate 59, it keeps the contact of a relay 60 closed. Thus, the relay contacts remain closed for the duration of the message. Outputs are also supplied from the blocking oscillators 56, 57 and 58 to another "or" gate 61 which in turn controls two timers 62 and 63. The five bit timer 62 responds to a single hole in a message to provide a "decode" command, and the ten bit timer 63 responds to two sequential holes of a message to supply a "message end" command.

The leading edge of a mark pulse (receive one) actuates trigger circuit 54 which in turn fires the blocking oscillator 58 to produce a binary one output pulse. The trailing edge of that mark pulse causes the trigger circuit 54 to switch back to its original state and supply an output to the blocking oscillator 57 causing it to produce an output pulse which is the phase A clocking pulse. If the next pulse is a space pulse (receive zero), its leading edge changes the state of the trigger circuit 55 which in turn fires the blocking oscillator 56 to produce a zero output pulse. At the same time, an output is supplied from the trigger circuit 55 to the blocking oscillator 57 to recondition that oscillator and make it responsive to the next output from the other trigger circuit 54.

Figure 6:
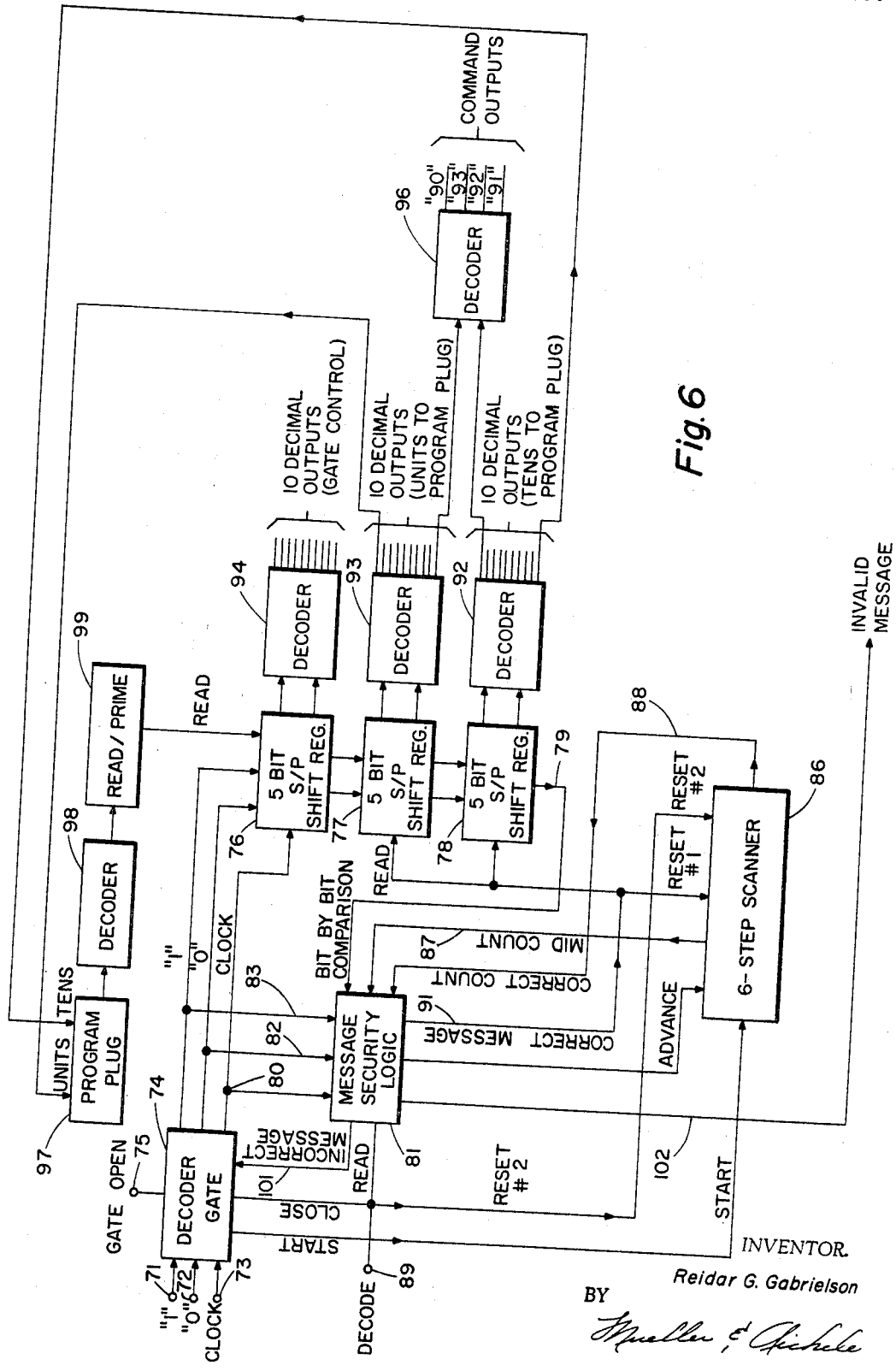
FIG. 6 is a block diagram of a typical first level decoder such as that identified DE-3A in FIG. 3.

The one, zero and clock pulses are supplied from the receiver channel to input terminals 71, 72 and 73 respectively of a first decoder level such as that shown in FIG. 6. The decoder of FIG. 6 is the DE-3A module used in the remote station of FIG. 3. The one and zero pulses pass through the decoder gate 74 and are fed serially into three five-bit shift registers 76, 77 and 78. Since the DE-3A decoder is designed to handle three digits of a message, the total capacity of the three shift registers must be fifteen bits because there are five bits per digit.

The first three digits of an incoming message (the first message frame) will load the shift registers 76, 77 and 78 to capacity. As the second message frame arrives, it will shift out serially the first message frame and supply it via line 79 to the message security logic circuitry 81. This input to the message security logic may be considered as the first message frame delayed. The second message frame is supplied directly to the message security logic via inputs 82 and 83. Incoming clock pulses are supplied from terminal 80 to the logic circuitry 81 and to the shift register 76 in order to provide the necessary timing.

The logic circuitry 81 includes a counter which counts the bits arriving at inputs 82 and 83. For every five bits registered by the counter, it produces an output called an "advance" pulse which steps a scanner 86 one step. At the end of the first message frame, the scanner has advanced three steps and is midway through its scanning cycle. At this time, the scanner produces a mid-count output which goes to the logic circuitry 81 via line 87. The mid-count signal causes the logic circuitry to start comparing the second message frame with the first message frame.

As long as each two corresponding bits of the first and second message frames are identical, the counter of the logic circuitry will continue to advance. By the time the second message frame has been received completely, the three shift registers 76, 77 and 78 are loaded to capacity with the second message frame. Meanwhile, the scanner 86 has advanced to the end of its scanning cycle, and at this time produces a "correct" count output on line 88.

A short time after the "correct" count output, the "decode" command signal arrives at terminal 89. The decode signal turns off the gate 74 and reads out the message security logic. If the logic circuitry has counted thirty bits, it produces the "correct message" pulse which goes via line 91 to the scanner 86 and to shift registers 77 and 78. The "correct message" pulse resets the scanner and reads out the information stored in the shift registers.

The shift registers 77 and 78 supply parallel outputs to decoders 92 and 93 each of which has ten output lines. The latter decoders decode the first two digits of the message which would ordinarily be the address of the receiving station. The other shift register 76 supplies its outputs to a decoder 94 which decodes the message label digit. Decoder 94 also has ten output lines, and these outputs are connected to the gate open controls of the decoder gates of other decoding levels included in the station. Thus, the message may be any of ten different types and as many as ten different decoding levels may be controlled by the DE-3A first level decoder shown in FIG. 6.

One of the outputs from decoder 92 and one output from decoder 93 are supplied to a further decoder 96 for decoding system housekeeping commands. These commands are sent to all stations of the system, and an example is the smear command described in connection with FIG. 1. In the particular embodiment being described, the decimal digits 90, 91, 92 and 93 are reserved for system housekeeping commands, and the decimal digit 90 is assigned to smear commands.

Another output from each of the two decoders 92 and 93 is fed via a program plug 97 to a decoder 98 which activates a module 143 for supplying reading current to the shift register 76. Thus, the correct message output from the logic circuitry 81 reads out shift registers 77 and 78, and the decoded address from the latter shift registers causes the other shift register 76 to be read out via the reading module 99.

If the counter of the logic circuitry 81 registers a count of something other than 30 after the end of the message, it produces an "incorrect message" output on line 101. When the "decode" signal arrives at terminal 89, it will read out the message security logic circuitry and an "invalid message" output will appear on line 102. The "decode" signal also closes the gate 74 and resets the scanner 86 if the message was incorrect. Since there will be no "correct message" output on line 91, the shift registers 76, 77 and 78 will not be read out, and the message will not be decoded.

Figure 7:
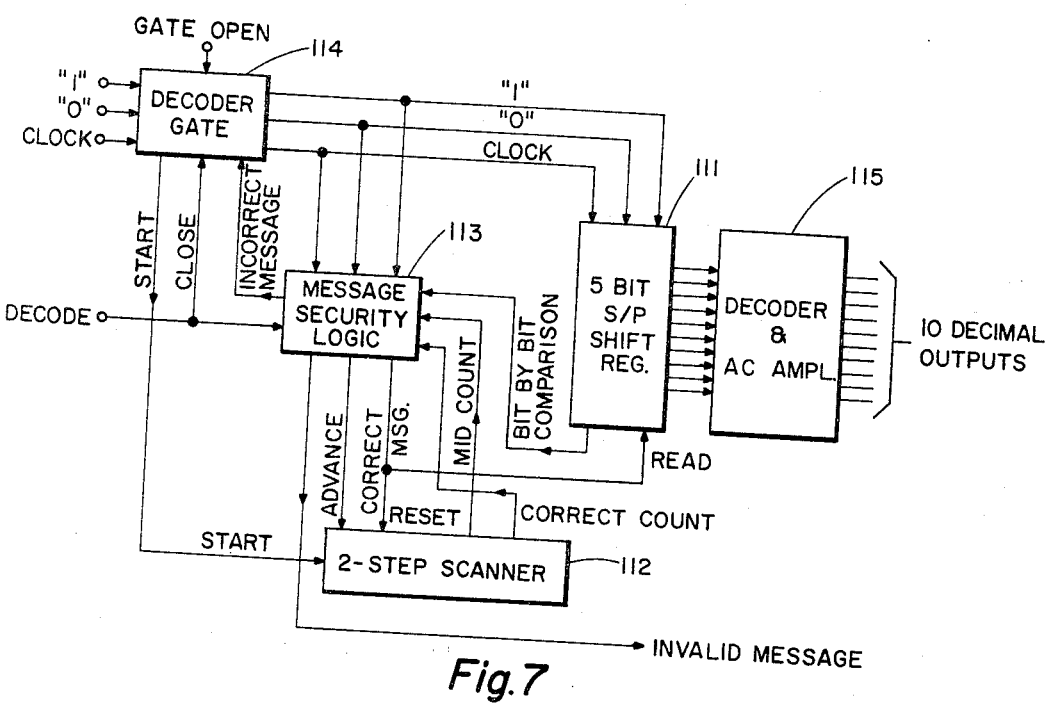
FIG. 7 is a block diagram of another first level decoder, in this case the one identified DE-1 in FIG. 4.
Figure 8:
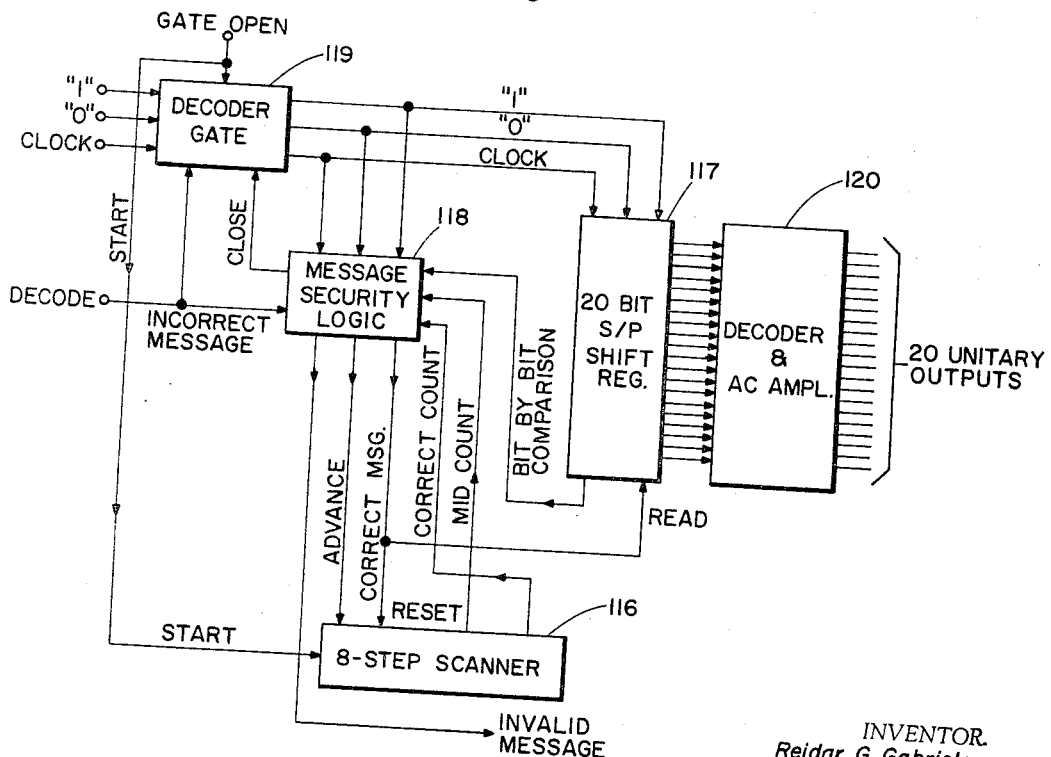
FIG. 8 is a block diagram for a second level decoder such as the DE-4 unit shown in FIG. 4.

The other decoding levels of the system are similar to the DE-3A decoder shown in FIG. 6, but will be designed to handle a different number of digits. FIG. 7 shows a simplified block diagram for a DE-1 decoder such as the first level decoder 34 of FIG. 4. As previously mentioned, this decoder handles only one digit, and so only one five bit shift register 111 is required. For the same reason, the scanner 112 has only two steps, and the counter of the message security logic circuitry 113 will count up to ten if the message is correct. The decoder gate 114 and the decoding module 115 corresponds to modules 74 and 92 in FIG. 6. The sequence of operation is also the same as has been described in connection with FIG. 6.

FIG. 7 is a functional block diagram for a DE-4 decoder such as those used at the central station of FIG. 4. This decoding level has the same functional blocks as the DE-1 decoder of FIG. 7, but is designed to decode four digits. Therefore, the scanner 116 has eight steps and the shift register 117 has a twenty bit capacity. The counter of the message security logic 118 will register twenty counts for a correct message. A decoder gate 119 and an output decoder 120 are again provided as previously described.

The shift registers of the equipment which has been described may be constructed with true and complement magnetic cores in the manner described and claimed in application Ser. No. 229,852, filed on Oct. 11, 1962, by L. R. Smith and assigned to the present assignee. The decoder modules which receive outputs from the shift registers may be implemented with toroidal cores in the manner described and claimed in application Ser. No. 299,727, filed on Aug. 5, 1963, and assigned to the present assignee. The latter application and also application Ser. No. 299,859, filed on Aug. 5, 1963, by R. G. Gabrielson and L. R. Smith describe and claim the housekeeping aspects of the system and also disclose specific circuits which may be used to implement the system described herein. Accordingly, the disclosure of circuits in those applications is incorporated herein by reference.

The invention provides a variable message length capability for digital supervisory control systems which makes more efficient use of available bandwidth than a fixed length message structure. By identifying messages by type, and through the use of level-by-level decoding as described herein, it is possible to optimize the length and structure of each message for its function and information content. An important advantage is the ease with which a given system can be expanded after installation without requiring extensive modification of the original equipment.

I claim:

1. The digital supervisory control system including in combination a first station including encoding means for encoding messages comprising a series of binary coded bits with uncoded gaps between different portions of the message, said encoding means being adapted to encode information in a first portion of the message for identifying different types of messages some of which have different lengths and to encode further information in succeeding portions of the message, a second station including a receiving channel for receiving messages from said first station, a first decoder level coupled to said receiving channel having means to decode only a first portion of the message including message type information therein to provide a control signal, a plurality of additional decoder levels coupled to said first decoder level for decoding portions of a message following said first portion thereof, said additional decoder levels being selectively rendered responsive to a message by said control signal from said first decoder level, with the selection of a particular one of said additional decoder levels depending on the message type information in the first portion thereof.

2. A digital supervisory control system comprising:

a central station including encoding means for encoding messages comprising a series of binary coded bits with uncoded gaps between different portions of the message, said encoding means being adapted to encode information in a first portion of the message for identifying different types of messages and to encode further information in succeeding portions of the message, a remote station including a receiving channel for receiving messages from said central station, a first decoder level coupled to said receiving channel having a plurality of output portions and having means to decode only a first portion of the message including message type information therein to provide a control signal at a particular one of said output portions corresponding to the message type, a plurality of additional decoder levels coupled respectively to said output portions of said first decoder level for decoding portions of a message following said first portion thereof, said additional decoder levels being selectively rendered responsive to a message by a control signal from said first decoder level so that said first decoder level routes the message to a selected one of said additional decoder levels in accordance with the message type information.

3. A digital supervisory control system comprising:

a central station including encoding means for encoding messages comprising a series of binary coded bits with uncoded gaps between different portions of the message, said encoding means being adapted to encode station address information and message type information in a first portion of the message and to encode further information in succeeding portions of the message, a plurality of remote stations, each including a receiving channel for receiving messages from said central station, a first decoder level coupled to said receiving channel having a plurality of output portions and having means to decode only the first portion of the message including the station address and message type information therein to provide a control signal at a particular one of said output portions corresponding to the message type information, a plurality of additional decoder levels coupled respectively to said output portions of said first decoder level for decoding portions of a message following said first portion thereof, said additional decoder levels being selectively rendered responsive to a message by said control signal from said first decoder level, with the selection of a particular one of said additional decoder levels depending on the message type information in the first portion thereof.

4. A digital supervisory control system including in combination, a first station including encoding means for encoding messages comprising a series of binary coded bits with uncoded gaps between different portions of the message which portions have different lengths, said encoding means being adapted to encode information in a first portion of the message for identifying different types of messages and to encode further information in succeeding portions of the message, and a second station including a receiving channel for receiving messages from said first station, a first decoder level coupled to said receiving channel having means to decode only a first portion of the message including message type information therein, and having further means to check the length of said first message portion and operative to reject any message having a first portion of an incorrect length, a plurality of additional decoder levels coupled to said first decoder level for decoding portions of a message following said first portion thereof, said additional decoder levels being selectively rendered responsive to a message by said control signal, and each of said additional decoder levels having means to check the length of the message portion decoded thereby and to reject any message in which that message portion is of an incorrect length.

5. A supervisory control system having a central station and a plurality of remote stations joined by a common communication system with each remote station having a unique address, the improvement including in combination, means in the central station for transmitting to the communication system a plurality of signals including signals indicating an address of a selected remote station, a message label and a message having a length corresponding with said label, means in each remote station for receiving said transmitted signals including basic receiver channel means responsive to said address signals indicating the address of the respective remote station to decode said label indicating signals and supply control signals indicating corresponding with said label, a plurality of decoder levels in each remote station each capable of decoding a different length message and respectively responsive to said control signals to decode said message indicating signals received from the respective said remote station receiving means and error detection means in each level for detecting said length correspondence of said message indicating signals with said label signals and said decoder levels being operative to supply indicia of said message indicating signals only when said error detection means detects such correspondence.

References Cited

UNITED STATES PATENTS 3,175,191 4/1965 Cohn et al.
2,989,730 6/1961 Brosh.
3,110,013 11/1963 Breese _____ 340—163
3,223,970 12/1965 Abbott et al. _____ 340—147

JOHN W. CALDWELL, *Primary Examiner.*

H. PITTS, *Assistant Examiner.*